3,029,185
METHOD OF TREATING MANGE
Frank Kral, Lima, Pa., assignor to The trustees of The University of Pennsylvania, Philadelphia, Pa., a corporation of Pennsylvania
No Drawing. Filed Oct. 1, 1959, Ser. No. 843,637
4 Claims. (Cl. 167—53)

This invention relates to antiparasitic compositions and to methods useful in the treatment of mange.

Mange is an external disease of mammals. It has been known since ancient times and is widely prevalent throughout the North American Continent, Europe and Africa. The causative organism is the mite, a member of the family Sarcoptidae. Six genera of mites are known, each having a number of species which are identifiable by their morphological characteristics and host specificity. They produce inflammatory cutaneous lesions of varying degrees of severity, associated with intense itching. Of the many known types of mange, the two which are responsible for the greatest economic losses are the demodectic and the sarcoptic. This, largely because they afflict a wide variety of mammals, including lower animals, both domestic and wild, as well as humans. Included among lower animals are dogs, horses, goats, cattle, sheep, swine, cats, rabbits, and foxes.

Demodectic mange, also known as "demodicosis" is caused by a particular group of parasitic mites which live in the hair follicles and the sebaceous glands of various mammals. A peculiar characteristic of the disease is that the presence of Demodex mites in animals which are in a perfect state of health is of little consequence. However, if the host animal is subjected to devitalizing factors such as nutritional deficiencies, internal parasites or systemic disorders, the mites bring about the development of demodectic mange. They penetrate the hair follicles, destroy the root sheath and the papillae and, finally, the sebaceous glands. The altered and decomposed sebum is a favorable medium for growth and multiplication. As a result, the hair follicles become enlarged, the epithelial lining layers of the papillae atrophy and the hairs break or fall out. If the disease is allowed to progress untreated, the mammal becomes predisposed to secondary infection.

Exclusive of morphological characteristics and host specificity, sarcoptic mange differs from the demodectic type in that the former is readily transmissible among mammal species. It commonly affects dogs and purebred herds as well as individuals. It can be spread particularly quickly and widely with the sale of breeding stock.

The path of infestation in sarcoptic mange is the subdermal layer. The disease spreads, by means of a burrowing mechanism, over the skin of the infested mammal. Scaling and severe itching are the most readily detectible symptoms. If allowed to develop without treatment, the lesions cover the entire body. Emaciation develops, followed by weakness, loss of appetite and, ultimately, death.

Heretofore the treatment of mange, whether it be demodectic, sarcoptic or other, has embraced a wide variety of substances, each selected because of its capability to destroy the parasites without harming the mammal. External applications of benzene hexachloride or lindane by spraying or dipping the animal in a vat have produced moderate success. Among other remedies these may be included: alcoholic liniments, fatty oil liniments, arsenic, carrosive sublimate, benzyl benzoate lotion for sarcoptic mange and Fowler's solution, phenamidine (subcutaneously), sterile sea water (intraperitoneally), garlic (orally), hexachlorocyclohexane (subcutaneously) for demodectic mange. Neither these, nor any other known methods of therapy, have produced clinically satisfactory results and the search has continued, without success, for a means to destroy the invading parasitic organism quickly and effectively.

I have now discovered that compositions containing from about 400 mgm. to about 600 mgm., preferably about 500 mgm. griseofulvin per dosage unit when administered systemically to mammals afflicted with mange, such as for example demodectic or sarcoptic, are capable of reversing the parasitic process promptly and safely. Although the exact amount of griseofulvin to be administered on a per diem basis will vary within certain limits depending upon the severity, extent and duration of the disease, the weight, size and condition of the mammal and other clinical factors, best results are obtained when one dosage unit of the griseofulvin composition, i.e., containing from about 400 mgm. to about 600 mgm. griseofulvin is administered daily for about 3 to 5 days, followed by one-half dosage unit administered daily for about fifteen to about twenty-five days, preferably about 18 to 21 days.

*Clinical evidence.*—Fourteen dogs under one year of age, afflicted with dry, squamous-crusted demodectic acariasis, were given a composition containing 500 mgm. griseofulvin for a period of three days by the oral route. On the fourth day and continuing through the twenty-first day, the daily dose was reduced by one-half, i.e., to a composition containing 250 mgm. griseofulvin. All fourteen dogs were cured. Seven to ten days after initiation of treatment, the process of healing of the skin lesions was marked, the examination of the skin scrapings, which originally showed many demodectic mites, revealed few mites of which some were still alive. The dead mites showed a morphological change in structure. Eight to ten days later, no mites were found and the lesions were healing.

Systemic treatment of mange in accordance with the present invention is accomplished by oral administration of a liquid, solid or semi-solid composition containing from about 400 mgm. to about 600 mgm. griseofulvin per dosage unit. Such compositions may be in the form of dispersions, suspensions, emulsions, powders, or in solid, shaped form such as pills, capsules or, preferably, tablets containing, if desired, other therapeutically-active ingredients. In formulating the preferred tablet form, there may be employed binding agents such as starch, methyl cellulose, vegetable proteins, carboxymethylcellulose, lactose, and lubricating agents such as stearic acid, talc, cocoa butter or magnesium stearate.

Where the condition is complicated by the presence of a secondary infection, as for example in the case of pustular demodectic mange, it may be desirable to combine the griseofulvin component with a substance capable of reducing the pyogenic infection and enabling the griseofulvin to exert its antiparasitic power. Thus, there may be incorporated in the dosage-unit griseofulvin composition penicillin, tetracycline, chlortetracycline, oxytetracycline or other antibiotic substances. Further, there may be incorporated quantities of anti-inflammatory agents such as cortisone, hydrocortisone, prednisone or prednisolone to enhance restitution of normal tissue and hair growth.

Although systemic administration of the dosage-unit compositions per se is satisfactory, optimal results are obtained if a diet regimen high in protein content is observed. Thus, it is advantageous to feed the mammal, during the period of therapy, high protein edibles such as meat, milk, eggs, vegetables, e.g., carrots, spinach or onions, or amino acid concentrates such as protein hydrolysates.

What I claim is:

1. A method for treating mange which comprises administering to animals suffering from mange a high protein diet and a dosage-unit composition comprising, intimately admixed with each other, griseofulvin in an amount from about 400 mgm. to about 600 mgm. per dosage-unit and a pharmaceutical carrier.

2. A method for treating mange which comprises administering to animals suffering from mange a high protein diet and a solid, shaped, dosage unit composition comprising, intimately admixed with each other, griseofulvin in an amount from about 400 mgm. to about 600 mgm. per dosage-unit and a pharmaceutical carrier.

3. A method for treating mange which comprises administering to lower animals suffering from mange a high protein diet and a solid, shaped dosage-unit composition comprising, intimately admixed with each other, griseofulvin in an amount from about 400 mgm. to about 600 mgm. per dosage unit and a pharmaceutical carrier.

4. A method for treating mange which comprises administering to lower animals suffering from mange a high protein diet and daily for a period of about 3 days to 5 days, a solid, shaped, dosage-unit composition comprising, intimately admixed with each other, griseofulvin in an amount from about 400 mgm. to about 600 mgm. per dosage-unit and a pharmaceutical carrier; then daily for a period of about 15 to 25 days a solid, shaped, dosage-unit composition as aforesaid, but having a griseofulvin content about one-half in strength.

References Cited in the file of this patent

UNITED STATES PATENTS 2,900,304 Martin _____ Aug. 18, 1959

FOREIGN PATENTS 91,111 Norway _____ Jan. 4, 1958

OTHER REFERENCES

Science News Letter, Aug. 30, 1958, page 137.